(12) United States Patent
Bird et al.

(10) Patent No.: US 7,165,404 B2
(45) Date of Patent: Jan. 23, 2007

(54) METHOD FOR OPTIMIZING A LARGE-SCALE INDUSTRIAL FACILITY, ESPECIALLY A POWER PLANT

(75) Inventors: Alan Bird, Stoke-on-Trent (GB); Volker Schule, Leimen (DE); Manfred Gietz, Stuttgart (DE); Ewald Kitzmann, Weinheim (DE)

(73) Assignee: Alstom Technology Ltd, Baden (CH)

( * ) Notice: Subject to any disclaimer, the term of this patent is extended or adjusted under 35 U.S.C. 154(b) by 193 days.

(21) Appl. No.: 10/488,663

(22) PCT Filed: Sep. 12, 2002

(86) PCT No.: PCT/EP02/10223

§ 371 (c)(1),
(2), (4) Date: Mar. 4, 2004

(87) PCT Pub. No.: WO03/023195

PCT Pub. Date: Mar. 20, 2003

(65) Prior Publication Data

US 2004/0244378 A1    Dec. 9, 2004

(30) Foreign Application Priority Data

Sep. 12, 2001  (DE) .............................. 101 44 813

(51) Int. Cl.
*F01K 13/02*    (2006.01)
(52) U.S. Cl. .............................. 60/660; 60/667; 60/670
(58) Field of Classification Search .................. 60/643, 60/645, 660, 670, 667
See application file for complete search history.

(56) References Cited

U.S. PATENT DOCUMENTS

| | | | | |
|---|---|---|---|---|
| 4,106,628 A | * | 8/1978 | Warkentin et al. | 209/556 |
| 4,933,833 A | * | 6/1990 | Petroff | 700/9 |
| 5,170,124 A | * | 12/1992 | Blair et al. | 324/434 |
| 5,757,661 A | * | 5/1998 | Surville | 702/155 |
| 6,038,277 A | * | 3/2000 | Imase et al. | 376/259 |
| 6,877,460 B1 | * | 4/2005 | Ellis | 119/842 |
| 2005/0141683 A1 | * | 6/2005 | Ishii et al. | 379/93.01 |

FOREIGN PATENT DOCUMENTS

| | | |
|---|---|---|
| DE | 197 48 315 | 5/1998 |
| DE | 199 18 332 | 10/2000 |

OTHER PUBLICATIONS

PCT International Search Report dated Dec. 17, 2002 for PCT/EP02/10223.

* cited by examiner

*Primary Examiner*—Hoang Nguyen
(74) *Attorney, Agent, or Firm*—Arthur E. Fournier, Jr.; Timothy J. Olson

(57) ABSTRACT

The invention relates to a method for optimizing a large-scale industrial facility, especially a power plant, consisting of m subassemblies (BGj), wherein j=1(1)m and wherein the following steps are successively carried out: comparing the parameters (KGj) of all subassemblies (BG1 to BGj) with predetermined reference values (RWj); detecting the subassemblies (Bgi) with i=1(1)m, whose parameters (KG1) are worse than the reference values (RWi) and optimizing the subassemblies (BG1) whose parameters (KGi) are worse than the reference values (RW1).

10 Claims, 7 Drawing Sheets

METHOD FOR OPTIMIZING A LARGE-SCALE INDUSTRIAL FACILITY, ESPECIALLY A POWER PLANT

The invention relates to a method for optimizing a large-scale industrial facility, in particular a power station, and to a large-scale industrial facility, or power station, which is optimized using the method according to the invention.

Large-scale industrial facilities comprise various assemblies, some of which are connected in series and some in parallel with one another, and which produce the desired end product in various conversion steps from the raw materials.

In order to optimize the operation of such a large-scale industrial facility it is not sufficient and is not efficient to optimize each individual assembly in its own right, since there is a high probability that this approach will not achieve an overall optimum for the large-scale industrial facility. Even if the overall optimum for the large-scale industrial facility were to be achieved in this way, this procedure is generally associated with a high degree of use of technical and financial resources for optimization.

The invention is based on the object of providing a method which is suitable for optimizing widely differing large-scale industrial facilities, or power stations, such that a maximum improvement in the operating behavior of the large-scale industrial facility is achieved with minimum use of technical and financial resources.

According to the invention, this object is achieved by a method for optimizing a large-scale industrial facility, in particular a power station, comprising two or more assemblies, in which the following method steps are carried out successively:

comparison of characteristic variables of all the assemblies with predetermined reference values, determination of those assemblies whose characteristic variables are poorer than the reference values, and optimization of the assemblies whose characteristic variables are poorer than the reference values.

This method ensures in a simple manner that the only assemblies which are optimized are those which have a significant optimization potential. Assemblies whose characteristic variables are equivalent to or are better than the predetermined reference values are ignored during the optimization process, since optimization of these assemblies will generally result in a minor improvement in efficiency of the large-scale industrial facility despite involving considerable effort.

The systematic approach according to the invention to optimization of a large-scale industrial facility also ensures that any large-scale industrial facility which is optimized using the method according to the invention will have a good to very good operating behavior. The method according to the invention also offers the capability for restricting optimization to a small number of assemblies, so that considerable improvements in the operating behavior of the large-scale industrial facility can be achieved even with very little use of resources.

One variant of the invention provides for the optimization of an assembly to include the following method steps: subdivision of the assembly into subassemblies, comparison of characteristic variables of all the subassemblies with predetermined reference values, determination of those subassemblies whose characteristic variables are poorer than the reference values, and optimization of subassemblies whose characteristic variables are poorer than the reference values.

In a further refinement of the invention, this method can also be used more than once, thus resulting in increasing subdivision and thus more detailed analysis of the subassemblies. This method ensures that the only subassemblies which are in fact analyzed and optimized in detail are those which have a considerable improvement potential.

In various further refinements of the method according to the invention, the predetermined reference values may be of a technical nature and, in particular, may comprise efficiencies, emissions, powers, reliability, maintenance requirement and remaining lives.

Alternatively, in a further refinement of the method according to the invention, the predetermined reference values may be of a financial nature and may include, in particular, costs and proceeds, which result from the operation of the large-scale industrial facility or of the power station.

In order to achieve the maximum improvement in the operating behavior of the large-scale industrial facility with the minimum possible effort, a further addition to the method proposes that the assemblies whose characteristic variables are poorer than the reference values be investigated and optimized in terms of their technical improvement potential in the sequence of the discrepancy between the characteristic variable and the reference value. This ensures that the assemblies or subassemblies with the greatest improvement potential are optimized first.

Alternatively, it is also possible for the assemblies whose characteristic variables are poorer than the reference values to be investigated and optimized in terms of their technical improvement potentials in sequence such that the assembly which has the best cost/effectiveness ratio is the first to be optimized. The other assemblies are optimized subsequently.

In another refinement of the method according to the invention, it is also possible for the assemblies whose characteristic variables are poorer than the reference values to be investigated and optimized in terms of their technical improvement potentials in sequence such that the assembly which involves the least capital outlay is the first to be optimized. This method is particularly appropriate when only restricted means are available for optimization of the large-scale industrial facility or of the power station.

In a further addition to the method according to the invention, this method is applied to a power station, in particular to a steam power station, with the steam power station having at least one boiler, at least one steam turbine, at least one condenser, at least one boiler feed water pump, at least one generator and at least one flue gas cleaning device.

Owing to the high thermal power levels which are converted in steam power stations, even minor improvements in the operating behavior of the steam power station lead to considerable reductions in the environmental loads and to considerable savings in fuel consumption and, as a consequence of this, in the operating costs. Power stations, in particular steam power stations, are therefore particularly suitable for implementation of the method according to the invention.

In a further addition to the method according to the invention, the boiler has at least the following subassemblies: a fuel supply, an air supply with a fan, a air preheater, a high-pressure steam boiler and/or a superheater.

Further subassemblies of the steam turbine are a high-pressure part, an intermediate superheater and/or a low pressure part.

The condenser subassemblies are a condenser, a low-pressure preheater and/or a high pressure preheater.

The subassemblies of the generator include at least a 3-phase AC generator and a DC excitation machine.

The subassemblies of the flue gas cleaning device comprise a flue gas dust extractor, a flue gas fan and/or ash extraction.

It has been found to be advantageous to subdivide the assemblies of the steam power station as mentioned above into the subassemblies that have been claimed, since this subdivision ensures that intrinsically largely closed technical subsystems are optimized so that the interactions with other technical subsystems are no greater than necessary, and the complexity of the optimization task is thus minimized.

The object mentioned initially is likewise achieved by a computer method for carrying out one of the methods according to the invention, in which case the computer program may be stored in a storage medium.

The object mentioned initially is likewise achieved by a large-scale industrial facility, in particular a power station, with the facility, or the power station, having been optimized using one of the methods as claimed in claims 1 to 16.

Further advantages and advantageous refinements of the invention can be found in the following description, in the patent claims and in the following drawing, in which:

Figure 1:
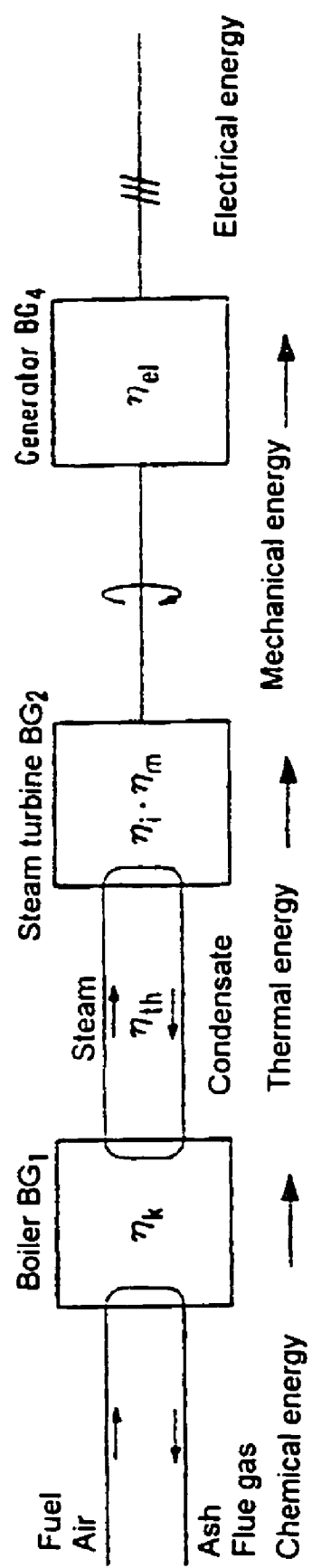
FIG. 1 shows a highly simplified block diagram of a steam power station.

FIG. 1 shows a highly simplified block diagram of a steam power station. Steam is produced in a boiler $BG_1$ by combustion of a fuel. This steam is supplied to a steam turbine $BG_2$ which converts the thermal energy contained in the steam to mechanical energy. The mechanical energy which is emitted from the turbine $BG_2$ is converted to electrical energy in a generator $BG_4$. FIG. 1 does not show, for example, a boiler feed water pump or the flue gas cleaning device.

Figure 2:
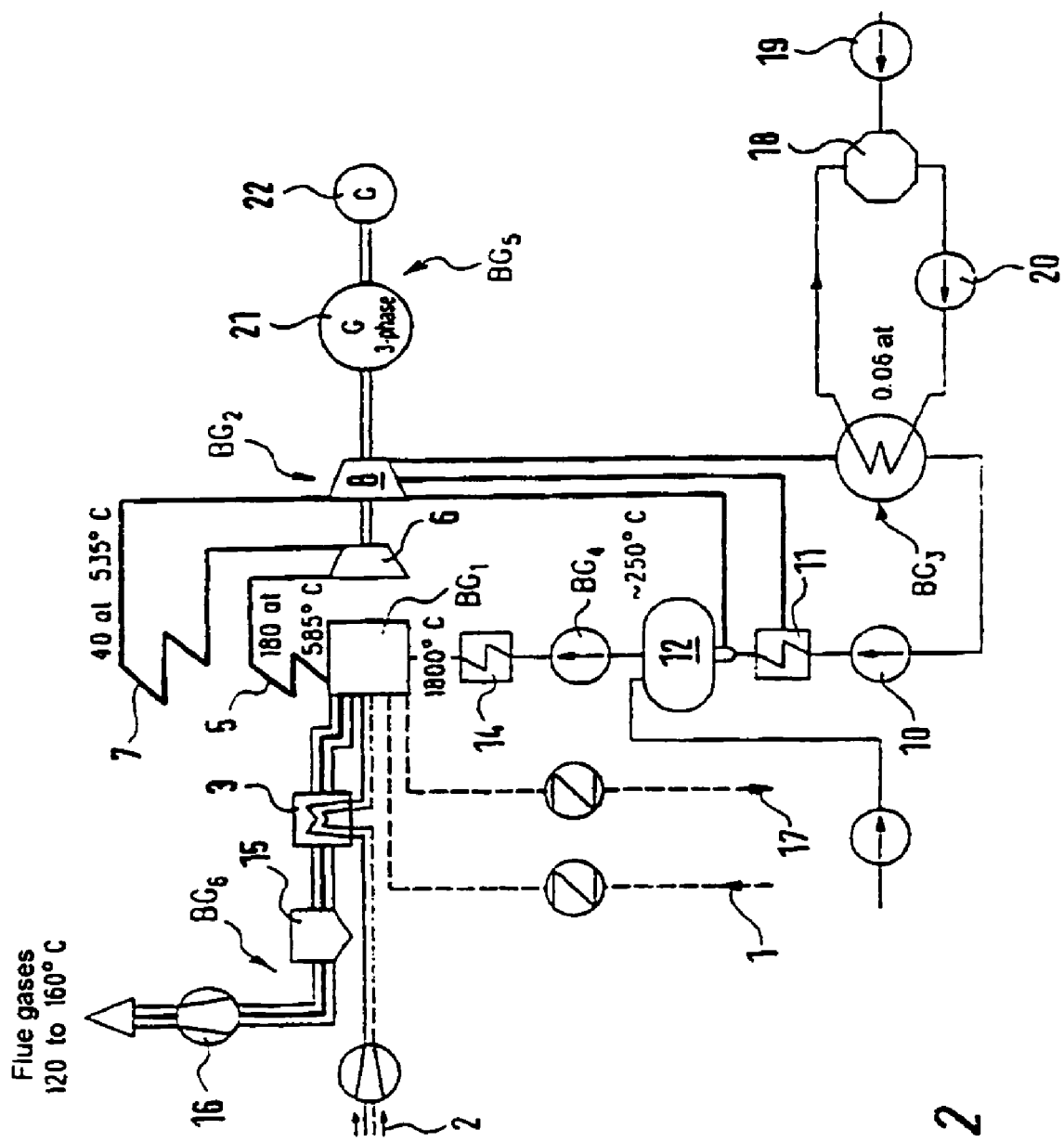
FIG. 2 shows a somewhat more detailed block diagram of a steam power station.

FIG. 2 shows a somewhat more detailed block diagram of a steam power station. The steam power station which is illustrated in FIG. 2 is intended to act as one of a large number of possible applications of the method according to the invention. Other large-scale industrial facilities can be optimized in a corresponding manner by transferring the method as described with reference to the steam power station to other large-scale industrial facilities.

In FIG. 2, a boiler $BG_1$ is fired via a fuel supply 1 and an air supply 2. The combustion air is preheated in an air preheater 3 by the flue gases from the boiler $BG_1$. Steam is produced in the boiler $BG_1$ and is then supplied to a superheater 5. This superheated steam is supplied to a high-pressure part 6 of the steam turbine $BG_2$. The partially expanded steam is then superheated in an intermediate superheater 7, and is supplied to a low-pressure part 8 of the steam turbine $BG_2$. The waste steam from the steam turbine $BG_2$ is supplied to a condenser $BG_3$, and is then passed by a condensate pump 10 to a low-pressure preheater 11 and to a feed water container 12. The boiler feed pump $BG_4$ passes the condensate from the feed water container 12 via a high-pressure preheater 14 to the boiler $BG_1$.

The flue gases from the boiler $BG_1$ are passed via the air preheater 3, a flue gas dust extractor 15 and a flue gas fan 16 to the outside world.

The ash which is produced during the combustion process is removed from the boiler $BG_1$ via an ash extraction device 17.

The condenser $BG_3$ is supplied with cold water from a cooling water pump 20 via a cooling tower 18. In order to improve the cooling performance of the cooling tower 18, water can be introduced into the cooling tower 18 via an additional water pump 19.

The generator $BG_5$ is in the form of a 3-phase generator 21 and a DC excitation machine 22.

The flue gas dust extractor 15 and the flue gas fan 16 form the flue gas cleaning device $BG_6$.

The assemblies $BG_1$ to $BG_6$ which are illustrated in FIG. 2 can be subdivided into the following subassemblies:

The subassemblies of the boiler $BG_1$ include the fuel supply 1, the air supply 2 with a fan, the air preheater 3, the high-pressure steam boiler 4 and/or the superheater 5.

Subassemblies of the steam turbine $BG_2$ include the high-pressure part 6, the intermediate superheater 7 and/or the low-pressure part.

The condenser $BG_3$ includes the cooling water pump 20, the cooling tower 18 and/or the additional water pump 19.

The subassemblies of the generator $BG_5$ include the 3-phase AC generator 21 and the DC excitation machine 22.

The flue gas cleaning device $BG_6$ comprises a flue gas dust extractor 15 and a flue gas fan 16.

The subdivision of the assemblies of a steam power station as described above, and of the associated subassemblies, may also be carried out differently, if this appears to be expedient.

Those components of the steam power station which are not explicitly associated with one assembly, such as the high-pressure preheater 14, the feed water container 12, the low-pressure preheater 11 and the condensate pump 10, may, by way of example, be associated with the condenser $BG_3$ or with some other assembly.

Figure 3:
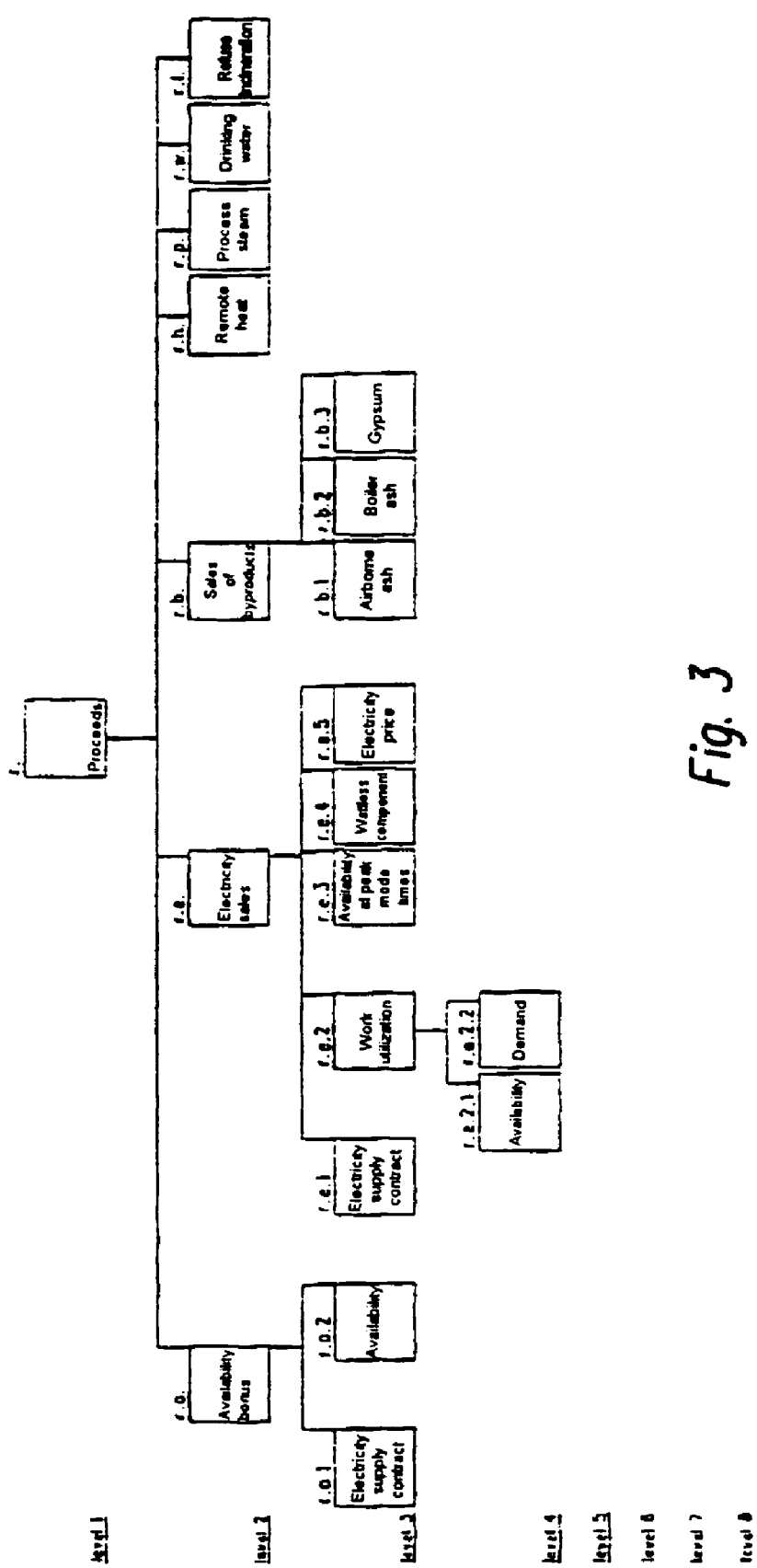
FIG. 3 shows the proceeds which can be achieved from operation of the steam power station.

A steam power station can be subdivided into very much more detail that has been done on the basis of the block diagram shown in FIG. 2. Irrespective of the detail into which the large-scale industrial facility is subdivided into assemblies and subassemblies, proceeds and costs can be associated with any large-scale industrial facility. FIG. 3 shows a structure diagram of the proceeds of a steam power station. According to FIG. 3, a steam power station may, for example, be subdivided into eight hierarchy levels, referred to as level 1 to level 8. According to FIG. 3, proceeds can be achieved in the hierarchy levels 1 to 4. The subdivision of the proceeds shown in FIG. 3 is self-explanatory, since the individual types of proceeds are entered in the boxes r.a. to r.r.2.2 in FIG. 3. The subdivision or the structure of the proceeds is indicated by the connecting lines between the individual types of proceeds. Comparison of the proceeds achieved in a steam power station to the optimized with reference values which, for example, originate from other steam power stations, makes it possible to identify any defects in the yields of the investigated steam power station in a simple and reliable manner. The investigation and technical optimization of those assemblies and subassemblies whose yields are defective make it possible to improve the yields of the investigated steam power station.

Figure 4:
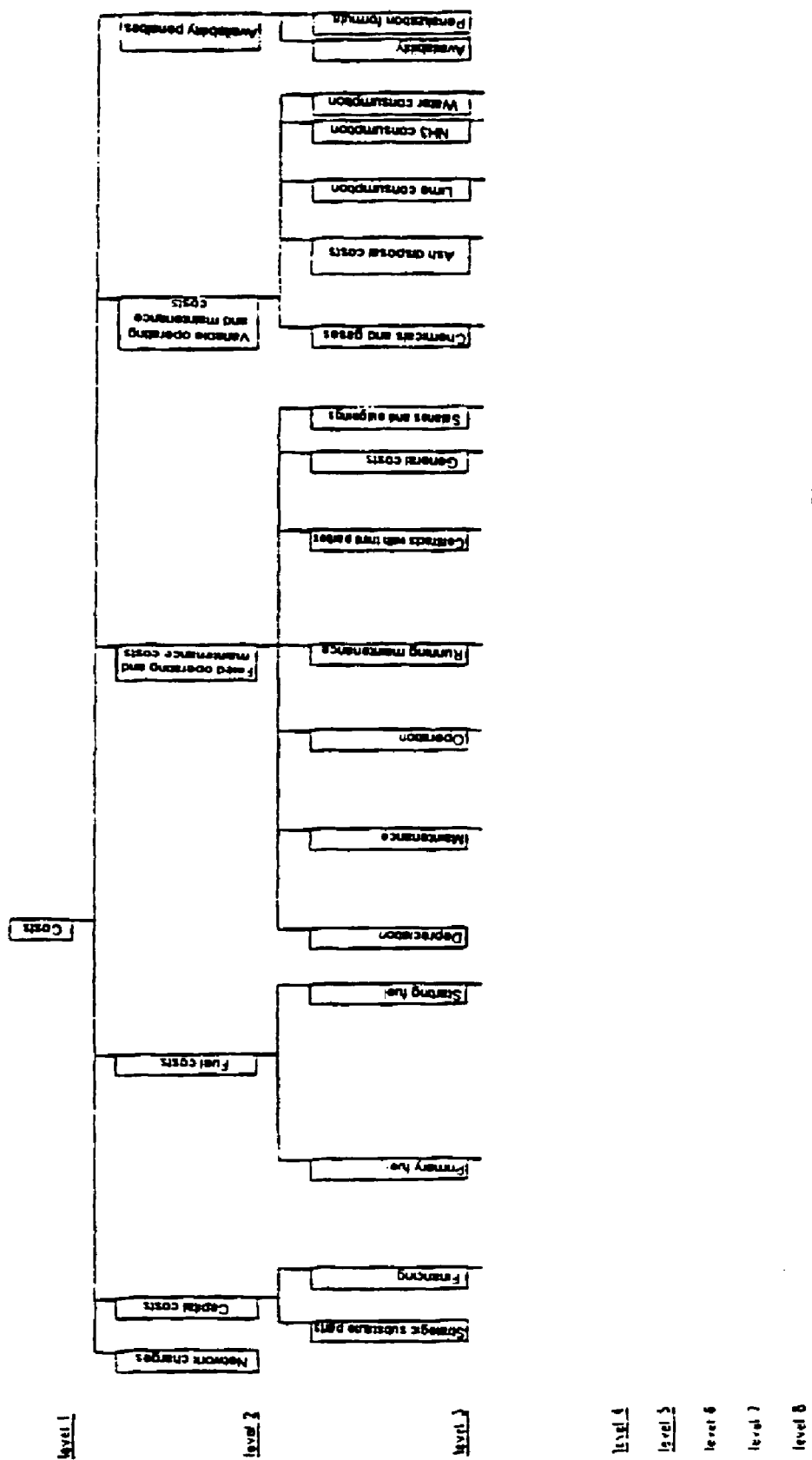
FIG. 4 shows the costs which are associated with operation of the steam power station in the form of an overview.

The costs which can be incurred during operation of the steam power station are compared with the proceeds from FIG. 3 in FIG. 4. By way of example, FIG. 4 shows only the costs down to level 3. Further hierarchy levels may also be introduced if required, of course (for example FIGS. 5, 6 and 7). As can be seen from FIG. 4, analysis of the cost aspects in the lower hierarchy levels for a steam power station leads to one or more subassemblies which contribute to the costs. Improvements to the engineering of individual subassemblies allow the operating behavior of the large-scale industrial facility, or of the steam power station, to be improved specifically.

Figure 5:
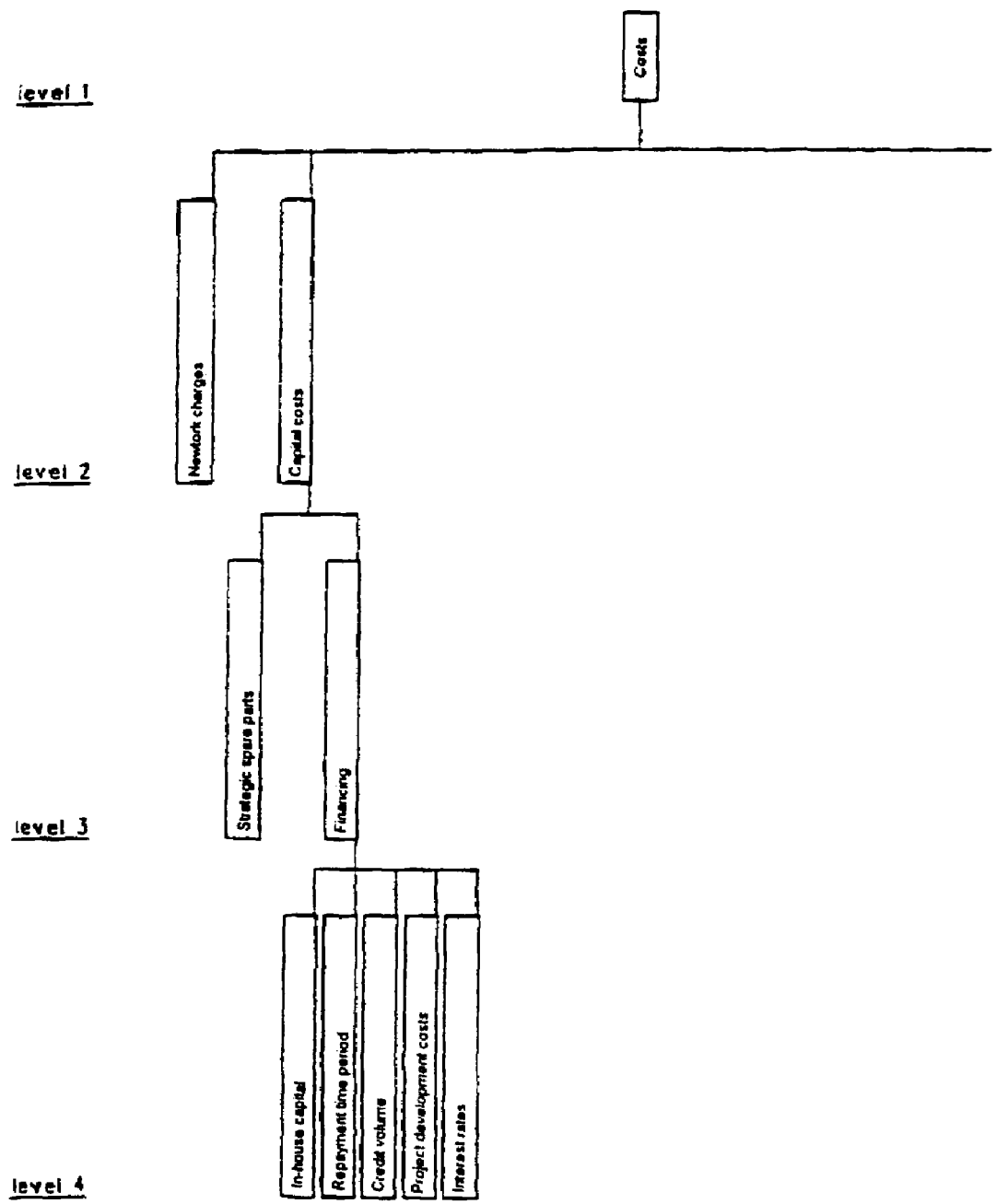
FIGS. 5 to 7 show detailed illustrations of areas of the cost structure shown in FIG. 4.
Figure 6:
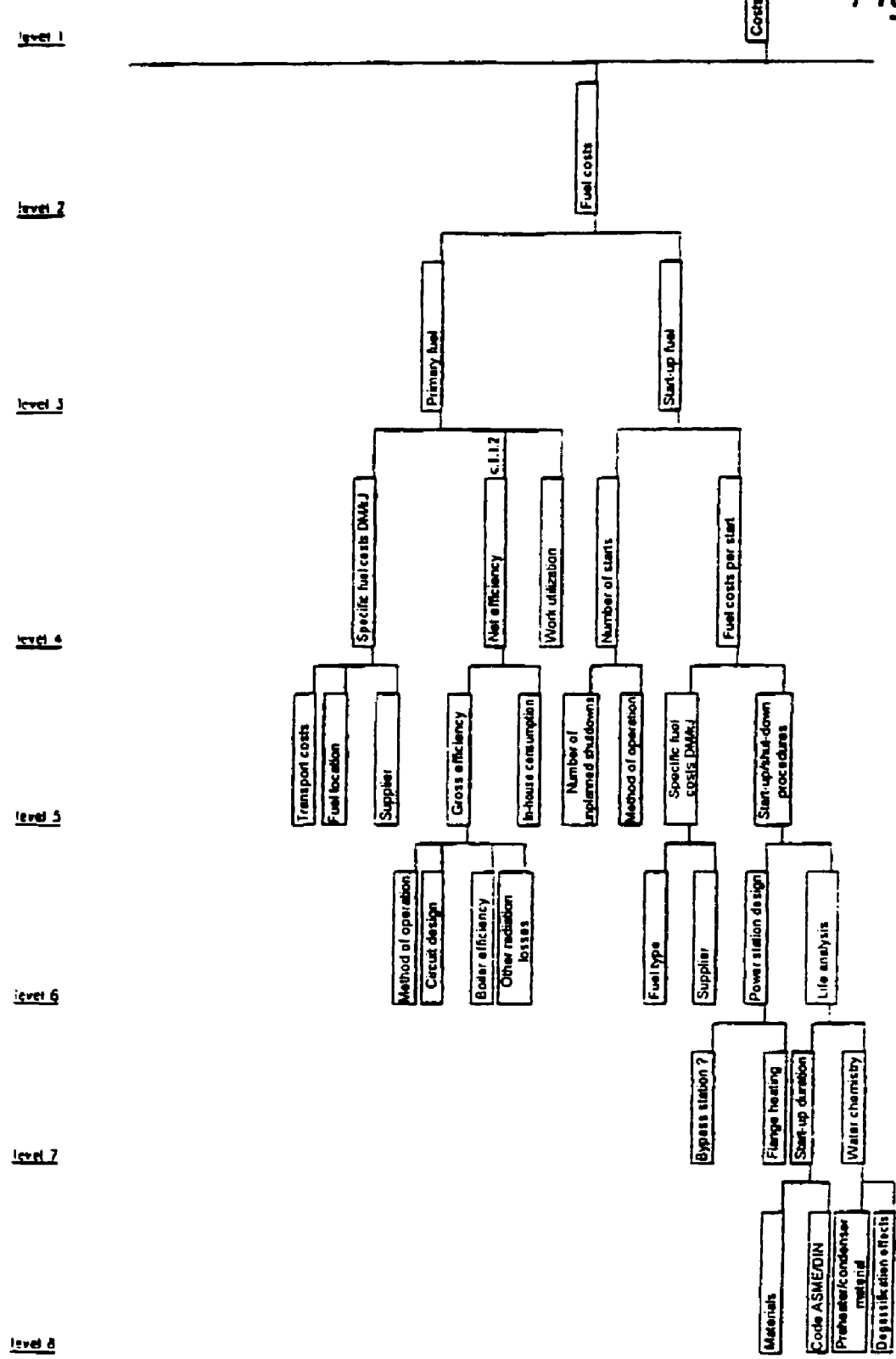
Figure 7:
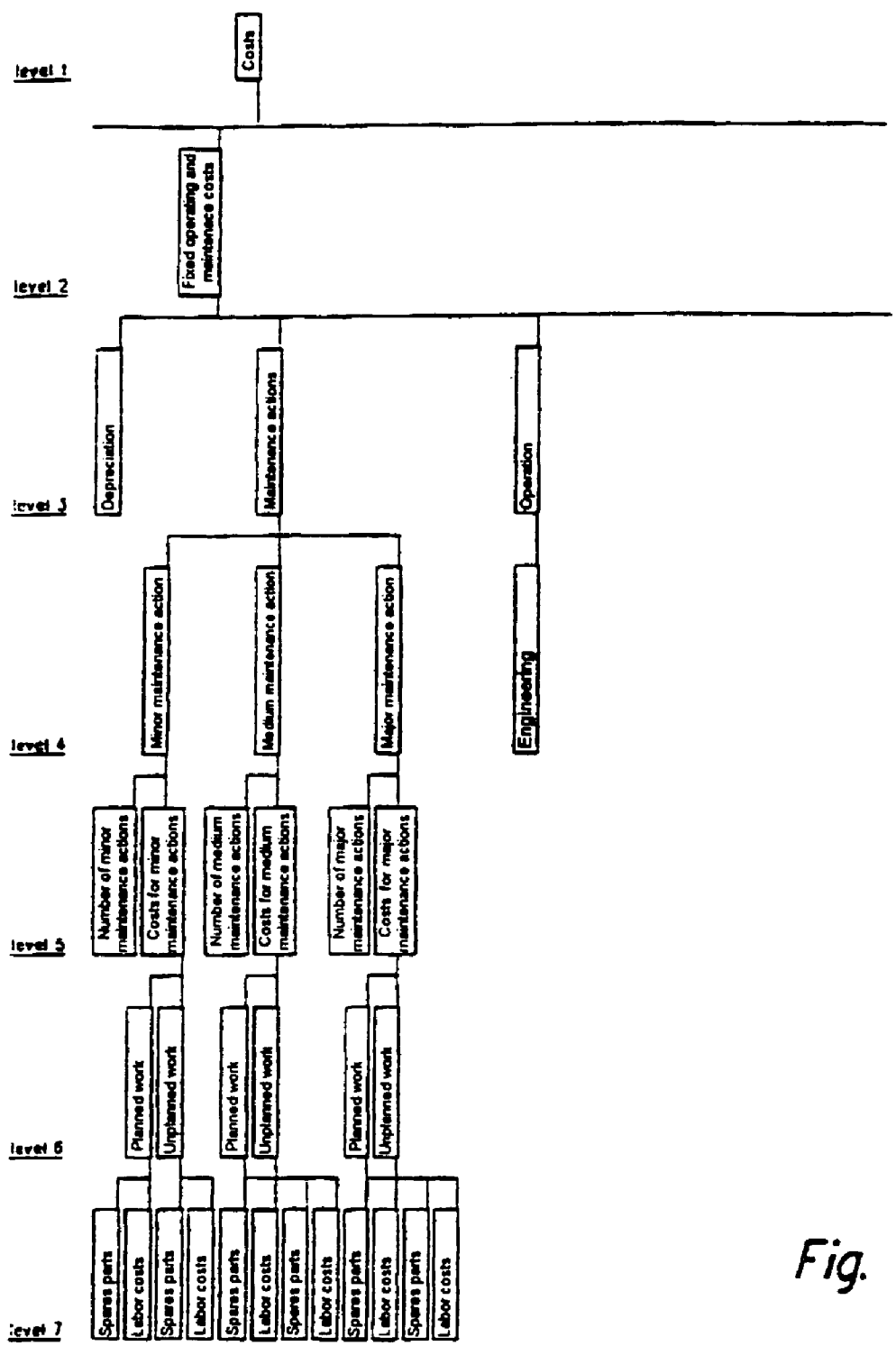

In FIGS. 5 to 7, the structure diagram of the costs shown in FIG. 4 is subdivided into four different areas, which are illustrated enlarged and in more detail. The example of the description of individual cost blocks in FIG. 4 is then provided in FIGS. 5 to 7.

FIG. 5 shows some of the overall costs in hierarchy level 1 are caused by the network charges and the capital costs. In hierarchy level 3, the capital costs are further subdivided into the costs for strategic spare parts and the financing of the power station. At level 4, the financing is subdivided into in-house capital, the repayment time period, the credit volume, the project development costs and the interest rate. The individual cost blocks can be described in even more detail, depending on the requirement. Each of these cost blocks can be filled with information, such as a reference value or some other value, so that, if the costs of a specific facility are known, it is quickly and efficiently possible to determine by comparison of the specific costs with the reference value and the other values in the cost block whether the costs of the investigated facility are good, or whether they can be improved.

Further costs which can be incurred during operation of the steam power station are subdivided in FIG. 6. The fuel costs can be subdivided into the costs for the primary fuel and the start-up fuel. Both the primary fuel and the start-up fuel can be further subdivided, as can be seen in FIG. 6. If the costs of the primary fuel are traced further, then it is evident from hierarchy level 4 that the net efficiency of the power station has an influence on the primary fuel costs. The net efficiency comprises the gross efficiency minus the in-house consumption of the steam power station (see level 5).

The gross efficiency in turn depends on the method of operation, on the circuit design, on the boiler efficiency and on the radiation losses. The gross efficiency is defined by the ratio of the electrical work which is emitted from the generator $BG_5$ and the chemical fuel energy which is supplied via the fuel supply 1. Reference values for the gross efficiency of a steam power station are between 30% and 45%.

Furthermore, the relationship between the steam mass flow in the turbine, the steam mass flow in the intermediate superheater, and the relationship with the generator power, as well as other items, may be noted in the block c.f.1.2 "net efficiency". In addition, it is possible to refer to the relevant literature or DIN Standards, so that the possible reason for poor net efficiency can be found as quickly as efficiently as possible.

The boiler efficiency, which is an influencing factor on the gross efficiency (hierarchy level 5) in hierarchy level 6 may be defined in detail, for example, by the following information: as reference values for modern boilers, the efficiency of boilers which are fired by brown coal is 89 to 90%. Boilers which are fired with oil or gas achieve efficiencies of up to 95%.

The boiler losses according to the prior art may be quantified as follows:

| | |
|---|---|
| Flue gas losses: | 5 to 9% |
| Moisture losses: | 4 to 5% |
| Unburned carbon in the ash: | >2% |
| Radiation losses: | 0.2 to 0.5% |

The losses may, for example, depend on the water content of the fuel, the moisture in the fuel and in the combustion air, the unburnt carbon in the ash and the heat conduction by radiation and convection to the surface of the heating boiler.

The radiation losses, which are also shown in hierarchy level 6, and which have effects on the gross efficiency, may be calculated, for example, in accordance with DIN 1942. On the basis of the values of the radiation losses calculated for the facility under investigation, it is possible by means of the reference values that are specified in the cited DIN to compare whether the radiation losses from the facility to be investigated are sufficiently low, or whether they should be improved further.

In a corresponding manner, each block shown in FIGS. 5 to 7 is associated with information which makes it possible to identify the improvement potential of the investigated facility by comparison of the values for a facility to be investigated with the reference values which are stored in the blocks. Furthermore, information as to how improvements can be implemented most expediently can also be stored for each block.

If one starts from hierarchy level 8, then it can be seen that the materials which were used for construction of the boiler also have an influence on the start-up fuel which is required to start up the power station. Improvements may result in the efficiency, in the availability, as well as reductions in the operating costs and in the environmental damage, depending on what material is used. For example, the stated improvements can be achieved by replacement of the pipework in the boiler and simultaneous replacement of CuZn28Sn1 as the material used for this purpose by titanium or X5CrNiMo 17 12 2.

FIG. 7 shows further costs, comprising the fixed operating and maintenance costs (see hierarchy level 2). Each of these blocks also has associated reference values which allow comparison of the costs actually incurred with an existing facility and with a facility to be investigated. Any improvement potential can be identified easily and reliably by comparison of the costs actually incurred with the reference values.

If, and this applies to all the hierarchy levels, the reference value is exceeded by the characteristic value for the investigated facility, there is no point in any further optimization, so that the subdivision and optimization can be terminated at this stage. Only if a considerable improvement potential has been determined from the comparison of the characteristic values for the investigated power station with the reference values is there any point in carrying out a further subdivision in order to identify as accurately as possible that subassembly which is the cause of the poor values for the investigated facility.

If a large-scale industrial facility, such as a steam power station, is investigated systematically in the described manner, this will necessarily result by virtue of the ever more detailed breakdowns of the facility in information as to which technical components of the large-scale industrial facility are poorer than the reference values. Deliberate improvement of these subassemblies makes it possible, with minimal use of resources of a technical and financial nature, to obtain the greatest possible improvement in the efficiency of the steam power station and in the financial viability of the large-scale industrial facility.

The invention claimed is:

1. A method for optimizing a steam power station having at least one boiler assembly, at least one steam turbine assembly, at least one condenser assembly, at least one generator assembly and at least one flue gas cleaning device, the method comprising the steps of:

comparing the characteristic variables of the at least one boiler assembly, of the at least one steam turbine assembly, of the at least one condenser assembly, of the at least one generator assembly and of the at least one flue gas cleaning device with predetermined reference values;

determining those assemblies of the at least one boiler assembly, of the at least one steam turbine assembly, of the at least one condenser assembly, of the at least one generator assembly and of the at least one flue gas cleaning device whose characteristic variables are poorer than their predetermined reference values; and optimizing only those assemblies of the at least one boiler assembly, of the at least one steam turbine assembly, of the at least one condenser assembly, of the at least one generator assembly and of the at least one flue gas cleaning device whose characteristic variables are poorer than their predetermined reference values.

2. The method as claimed in claim 1 wherein the optimizing step comprises the further steps of:

subdividing into subassemblies the at least one boiler assembly, the at least one steam turbine assembly, the at least one condenser assembly, the at least one generator assembly and the at least one flue gas cleaning device wherein the at least one boiler assembly includes at least some of the following subassemblies: a fuel supply subassembly, an air supply with a fan subassembly, an air preheater subassembly, a high-pressure boiler subassembly, a superheater subassembly and an ash extractor subassembly, and wherein the at least one steam turbine assembly includes at least some of the following subassemblies: a high-pressure part subassembly, an intermediate superheater subassembly and a low-pressure-part subassembly, and wherein the at least one condenser assembly includes at least some of the following subassemblies: a cooling water pump subassembly, a cooling tower subassembly and an additional water pump subassembly, and wherein the at least one generator assembly includes at least one of the following subassemblies: a 3-phase AC generator subassembly and a DC excitation machine subassembly, and wherein the at least one flue gas cleaning device assembly includes at least one of the following subassemblies: a flue gas dust extractor subassembly and a flue gas fan subassembly;

comparing the characteristic variables of all of the following subassemblies: the fuel supply subassembly, the air supply with fan subassembly, the air preheater subassembly, the high-pressure boiler subassembly, the superheater subassembly and the ash extractor subassembly of the at least one boiler assembly; the high-pressure part subassembly, the intermediate superheater subassembly and the low-pressure part subassembly of the at least one steam turbine assembly; the cooling water pump subassembly, the cooling tower subassembly and the additional water pump subassembly of the at least one condenser subassembly; the 3-phase AC generator subassembly and the DC excitation machine subassembly of the at least one generator assembly; and the flue gas dust extractor subassembly and the flue gas fan subassembly of the at least one flue gas cleaning device assembly with predetermined reference values;

determining those subassemblies from all of the following: the fuel supply subassembly, the air supply with fan subassembly, the air preheater subassembly, the high-pressure boiler subassembly, the superheater subassembly and the ash extractor subassembly of the at least one boiler assembly; the high-pressure part subassembly, the intermediate superheater subassembly and the low-pressure part subassembly of the at least one steam turbine subassembly; the cooling water pump subassembly, the cooling tower subassembly and the additional water pump subassembly of the at least one condenser subassembly; the 3-phase AC generator subassembly and the DC excitation subassembly of the at least one generator assembly; and the flue gas dust extractor subassembly and the flue gas fan subassembly of the at least one flue gas cleaning device assembly whose characteristic variables are poorer than their predetermined reference values;

optimizing only those subassemblies of all of the following: the fuel supply subassembly, the air supply with fan subassembly, the air preheater subassembly, the high-pressure boiler subassembly, the superheater subassembly and the ash extractor subassembly of the at least one boiler assembly; the high-pressure part subassembly, the intermediate superheater subassembly and the low-pressure part subassembly of the at least one steam turbine assembly; the cooling water pump subassembly, the cooling tower subassembly and the additional water pump subassembly of the at least one condenser subassembly; the 3-phase AC generator subassembly and the DC excitation subassembly of the at least one generator subassembly; and the flue gas dust extractor subassembly and the flue gas fan subassembly of the at least one flue gas cleaning device assembly whose characteristic variables are poorer than their predetermined reference values.

3. The method as claimed in claim 2 wherein the predetermined reference values are of a technical nature.

4. The method as claimed in claim 3 wherein the predetermined reference values comprise efficiencies, emissions, powers, reliability, maintenance requirements and remaining lives.

5. The method as claimed in claim 2 wherein the predetermined reference values are of a financial nature.

6. The method as claimed in claim 1 wherein the at least one boiler assembly, the at least one steam turbine assembly, the at least one condenser assembly, the at least one generator assembly and the at least one flue gas cleaning device whose characteristic variables are poorer than their predetermined reference values are optimized in order of their technical improvement potentials as determined using a difference between the predetermined reference values and the characteristic variables.

7. The method as claimed in claim 1 wherein the at least one boiler assembly, the at least one steam turbine assembly, the at least one condenser assembly, the at least one generator assembly and the at least one flue gas cleaning device assembly whose characteristic variables are poorer than their predetermined reference values are optimized in order of their associated cost savings.

8. The method as claimed in claim 1 wherein the at least one boiler assembly, the at least one steam turbine assembly, the at least one condenser assembly, the at least one generator assembly and the at least one flue gas cleaning device assembly whose characteristic variables are poorer that their predetermined reference values are optimized in order of their associated capital outlay.

9. A storage medium encoded with machine readable computer program code for optimizing a steam power station having at least one boiler assembly, at least one steam turbine assembly, at least one condenser assembly, at least one generator assembly and at least one flue gas cleaning device assembly, the storage medium including instructions for causing a computer to implement a method comprising the steps of:

comparing the characteristic variables of the at least one boiler assembly, of the at least one steam turbine assembly, of the at least one condenser assembly, of the at least one generator assembly and of he at least one flue gas cleaning device assembly with predetermined reference values;

determining those assemblies of the at least one boiler assembly, of the at least one steam turbine assembly, of the at least one condenser assembly, of the at least one generator assembly and of the at least one flue gas cleaning device assembly whose characteristic variables are poorer than their predetermined reference values; and optimizing only those assemblies of the at least one boiler assembly, of the at least one steam turbine assembly, of the at least one condenser assembly, of the at least one generator assembly and of the at least one flue gas cleaning device assembly whose characteristic variables are poorer than their predetermined reference values.

10. The storage medium as claimed in claim 9 wherein the optimizing step comprises the further steps of:

subdividing into subassemblies the at least one boiler assembly, the at least one steam turbine assembly, the at least one condenser assembly, the at least one generator assembly and the at least one flue gas cleaning device wherein the at least one boiler assembly includes at least some of the following subassemblies: a fuel supply subassembly, an air supply with fan subassembly, an air preheater subassembly, a high-pressure boiler subassembly, a superheater subassembly and an ash extractor subassembly, and wherein the at least one steam turbine assembly includes at least some of the following subassemblies: a high-pressure part subassembly, an intermediate superheater subassembly and a low-pressure part subassembly, and wherein the at least one condenser assembly includes at some of the following subassemblies: a cooling water pump subassembly, a cooling tower subassembly and an additional water pump subassembly, and wherein the at least one generator assembly includes at least one of the following subassemblies: a 3-phase AC generator subassembly and a DC excitation machine subassembly, and wherein the at least one flue gas cleaning device assembly includes at least one of the following subassemblies: a flue gas dust extractor subassembly and a flue gas fan subassembly:

comparing the characteristic values of all of the following subassemblies: the fuel supply subassembly, the air supply with fan subassembly, the air preheater subassembly, the high-pressure boiler subassembly, the superheater subassembly and the ash extractor subassembly of the at least one boiler assembly; the high-pressure part subassembly, the intermediate superheater subassembly and the low-pressure part subassembly of the at least one steam turbine assembly; the cooling water pump subassembly, the cooling tower subassembly and the additional water pump subassembly of the at least one condenser assembly; the 3-phase AC generator subassembly and the DC excitation machine of the at least one generator assembly; and the flue gas dust extractor subassembly and the flue gas fan subassembly of the at least one flue gas cleaning device assembly with predetermined reference values;

determining those subassemblies from all of the following: the fuel supply subassembly, the air supply with fan subassembly, the air preheater subassembly, the high-pressure boiler subassembly, the superheater subassembly and the ash extractor subassembly of the at least one boiler assembly; the high-pressure part subassembly, the intermediate superheater subassembly and the low-pressure part subassembly of the at least one steam turbine assembly; the cooling water pump subassembly, the cooling tower subassembly and the additional water pump subassembly of the at least one condenser assembly; the 3-phase AC generator subassembly and the DC excitation subassembly of the at least one generator assembly; and the flue gas dust extractor subassembly and the flue gas fan subassembly of the at least one flue gas cleaning device assembly whose characteristic variables are poorer than their predetermined reference values; and optimizing only those subassemblies of all of the following: the fuel supply subassembly, the air supply with fan subassembly, the air preheater subassembly, the high-pressure boiler subassembly, the superheater subassembly and the ash extractor subassembly of the at least one boiler assembly; the high-pressure part subassembly, the intermediate superheater subassembly and the low-pressure part subassembly of the at least one steam turbine assembly; the cooling water pump subassembly, the cooling tower subassembly and the additional water pump subassembly of the at least one condenser subassembly; the 3-phase AC generator subassembly and the DC excitation subassembly of the at least one generator assembly; and the flue gas dust extractor subassembly and the flue gas fan subassembly of the at least one flue gas cleaning device assembly whose characteristic variables are poorer than their predetermined reference values.

* * * * *